(No Model.) 2 Sheets—Sheet 1.
B. LJUNGSTRÖM.
BALL OR ROLLER RATCHET TOOL.
No. 549,377. Patented Nov. 5, 1895.
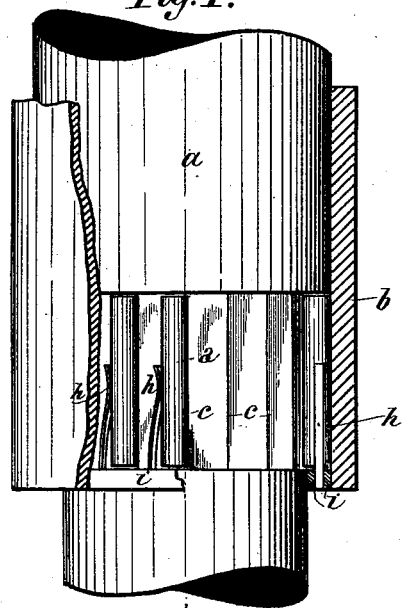
Fig. 1.
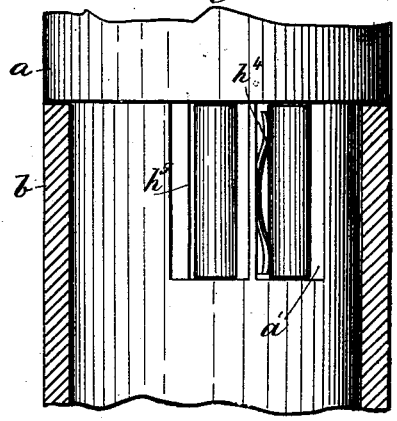
Fig. 1a.
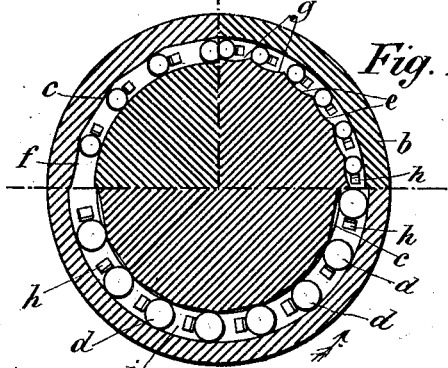
Fig. 2.
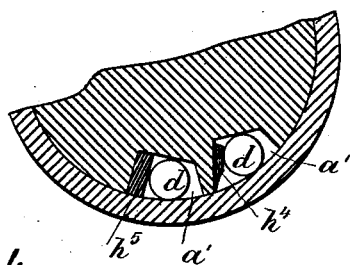
Fig. 2a.
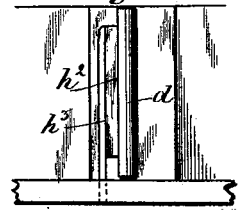
Fig. 3.a.
Fig. 4a.
Witnesses:—
H. B. Boulter
O. L. Northup
Inventor,
Birger Ljungström,
by his attorney
Wm B. Boulter.

(No Model.) 2 Sheets—Sheet 2.
B. LJUNGSTRÖM.
BALL OR ROLLER RATCHET TOOL.
No. 549,377. Patented Nov. 5, 1895.
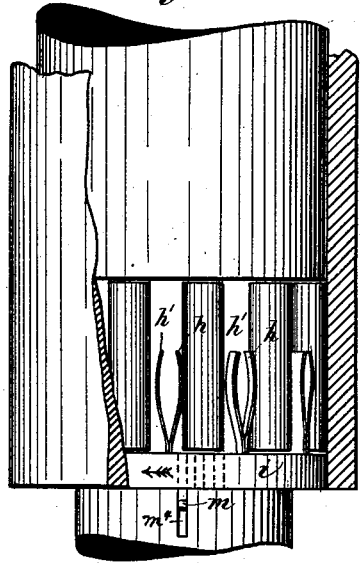
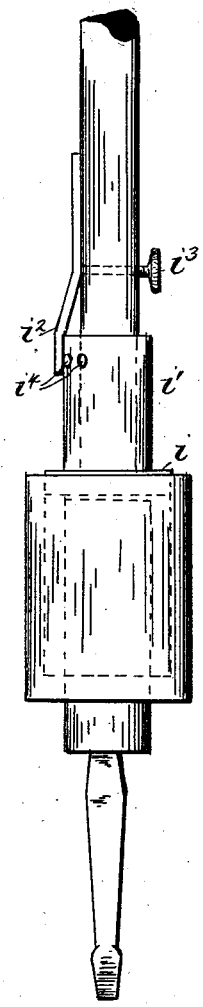
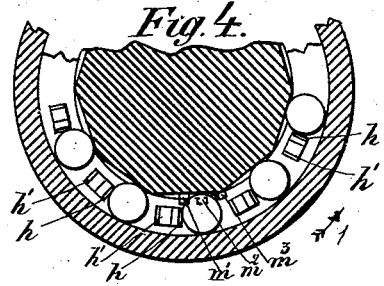

UNITED STATES PATENT OFFICE.

BIRGER LJUNGSTRÖM, OF STOCKHOLM, SWEDEN.

BALL OR ROLLER RATCHET-TOOL.

SPECIFICATION forming part of Letters Patent No. 549,377, dated November 5, 1895.

Application filed February 4, 1893. Serial No. 460,979. (No model.) Patented in Sweden March 15, 1892, No. 3,949.

*To all whom it may concern:*

Be it known that I, BIRGER LJUNGSTRÖM, a subject of the King of Sweden and Norway, residing at Stockholm, Sweden, have invented certain new and useful Improvements in Mechanical Tools or Devices, (for which Letters Patent have been obtained in Sweden, No. 3,949, dated March 15, 1892,) of which the following is a full, clear, and exact description.

My invention has relation to mechanical implements, tools, or devices, and it relates more particularly to a ball or roller ratchet device adapted to be used in connection with or to form part of tools—such as ratchet-drills, screwdrivers, &c.—wherein it may be desired to effect a rotative or a rectilinear movement of one portion thereof from another operating portion of the tool; and the invention consists in the construction, arrangement, and combination of parts, as hereinafter fully described, illustrated in the accompanying drawings, and pointed out in the appended claims.

In the drawings, Figure 1 is a sectional elevation, broken away, of a portion of a tool provided with my invention. Fig. 1ª is a similar view showing a different arrangement of the rollers as well as a differently-shaped spring for the same. Fig. 2 is a horizontal section of the construction shown in Fig. 1ª and showing elastic material for acting upon the rollers instead of the flat or bowed springs; Fig. 2ª, a horizontal section of parts seen in Fig. 1ª. Fig. 3 is a view similar to Fig. 1, but showing two springs for acting upon the rollers and also means for securing the spring-support in its adjusted positions. Fig. 3ª is a detail elevation showing an elastic piece for acting upon the roller and the support for said piece. Fig. 4 is a horizontal section of Fig. 3. Fig. 4ª is a detail view of still another form of spring. Fig. 4ᵇ is a plan view of a portion of a screwdriver with my invention applied thereto.

Referring to the above-described drawings, and more particularly to Figs. 1 and 2, which show the invention in its simplest form, *a* indicates an inner part, such as a shaft, of a mechanical tool or device, which shaft is to be operated from an outer part *b*, such as a sleeve, which part *a* is loosely mounted within the part *b*, as shown. In the form of my invention shown in said Figs. 1 and 2 the shaft *a* is to be rotated within the sleeve *b*, and for this purpose I may construct said shaft and sleeve in either of the three ways illustrated in the latter figure—that is to say, I may provide the shaft *a* with a series of beveled or inclined bearing-faces *c*, arranged as shown in the lower portion of Fig. 2, or the inner surface of the outer sleeve may be provided with a series of slightly-convex bearing-faces *f*, arranged as shown in the upper left-hand portion of Fig. 2, or I may provide the shaft *a* with a series of concave bearing-faces *e*, arranged as shown in the upper right-hand portion of Fig. 2.

The arrangement of the bearing-faces, whatever may be their shape, should be such that slightly-tapering or wedge-shaped recesses, spaces, or compartments will be formed between the inner surface of the sleeve *b* and the outer surface of the shaft *a*.

Within the tapering or wedge-shaped recesses formed as described I locate loosely a series of rollers *d*, as shown, which are of such diameter as to become wedged or tightly held between the shaft and sleeve when within the narrower portion of the recesses. (See Fig. 2.) The recesses formed by the faces *c* and *e* and the inner surface of sleeve *b* are narrowest at each end and slightly wider toward the middle, while the recesses formed by the faces *f* and said inner surface of sleeve *b* are widest at their ends and narrowest toward the middle.

Whatever construction may be employed the result obtained is the same, as will be presently seen.

*h* indicates a series of slightly-curved leaf-springs, which are arranged between the rollers and bear upon the latter to normally force them in a direction toward the narrower portion of the recesses—that is to say, in a direction corresponding to that in which the shaft *a* is to be moved.

The springs *h* are secured to a suitable support, such as a ring *i*, which may be suitably secured to the shaft *a* below the rollers.

By rotating the sleeve *b* in the direction of the arrow in Fig. 2 the rollers *d* by being tightly wedged within the narrow portions of the recesses cause the shaft *a* to be also rotated in a corresponding direction, there being therefore no lost motion between the parts. When the sleeve $b$ is rotated in the reverse direction, its inner surface will ride back over the rollers $d$, which latter, owing to the slight friction between the parts, turn backwardly very slightly, the shaft $a$ meantime remaining stationary, or should the rollers not turn backwardly, as mentioned, the friction between the sleeve and said rollers would be so slight that it would offer practically no resistance to the backward rotation of the sleeve. By reason of the stress of the springs the rollers will always be in a position to instantly effect the forward rotation of shaft $a$ when the sleeve $b$ is turned for that purpose.

Instead of employing springs for maintaining the rollers in the proper position within the recesses I may employ pieces $h^2$ of any suitable elastic material, which pieces $h^2$ are secured to rods $h^3$, secured to the support $i$.

As shown in Figs. 1$^a$ and 2$^a$, I employ bowed springs $h^4$ and dispense with the use of a supporting-ring $i$ for these springs, said springs $h^4$ being arranged within the wedge-shaped recesses $a'$, formed in the outer surface of the shaft $a$ and bearing at their ends upon the rollers, or instead of said springs I may employ an elastic packing $h^5$, located in said recesses and bearing upon the rollers. If instead of rollers I employ balls, I would then reverse the position of the springs $h^4$ and cause their bowed portions to bear upon the same and their ends to bear against the walls of the recesses, as will be understood.

In Figs. 3 and 4 I have shown a modified form of my invention wherein the rotation of the shaft $a$ may be effected in either direction, as desired, or such rotation prevented altogether. In this arrangement I employ curved springs $h\ h'$, arranged in pairs between the rollers, the said springs curving in opposite directions, as shown, and being secured to the supporting-ring $i$. The latter is provided with a series of notches $m'\ m^2\ m^3$, with which is adapted to engage a key $m$, arranged in a recess $m^4$ in the shaft $a$. When the ring $i$ occupies the position represented in Fig. 3, with the key $m$ engaging the notch $m'$, the springs $h$ bear against the rollers, and when the outer sleeve $b$ is turned in the direction of the arrow 1 in Fig. 4 the inner shaft will be caused to be instantly turned, also, in a manner similar to that described hereinbefore with reference to Figs. 1 and 2. By adjusting the ring $i$ in the direction of the arrow in Fig. 3 the pressure of springs $h$ upon the rollers will decrease, and finally the springs $h'$ may be made to bear upon the opposite side of the rollers, and then the shaft $a$ will be operated when the sleeve $b$ is turned in the direction of the arrow in Fig. 3. By adjusting the ring $i$ to such a point that the pressure of the springs $h$ will equal the pressure of the springs $h'$ (in other words, counteract each other) then the rollers will be in the widest portions of the recesses, and consequently the shaft $a$ will not be operated when the sleeve $b$ is turned in either direction. Instead of employing two springs between two adjacent rollers but one spring may be used, such as shown in Fig. 4$^a$, or an elastic arm $h^2$, if applied upon each side of arm $h^3$, though with such constructions it is not possible to render the shaft $a$ inoperative regardless of the direction in which the sleeve $b$ is turned, though a reversal of the operation of the device may be attained similar to that attained by the construction in Figs. 3 and 4.

By reason of the adjustable feature described the device may be used in connection with an ordinary screwdriver by causing the ratchet to act in one or the other direction, according as the screwdriver is to be used for screwing in or screwing out a screw.

For the purpose of effecting a more rapid adjustment and locking of the ring $i$, I would employ the construction shown in Fig. 4$^b$. The ring $i$ is here shown as provided with the extension $i'$ surrounding the handle, and by means of which extension the ring may be turned. The handle is provided with a leaf spring or hook $i^2$, provided with a tenon, which is adapted to engage in any of a series of holes $i^4$ in the extension. When it is desired to adjust the ring $i$, the screw-rod $i^3$ is turned to raise the leaf spring or hook $i^2$ and disengage its tenon from the hole $i^4$, after which the ring may be turned the desired distance and then the spring or hook $i^2$ allowed to engage another hole $i^4$.

It will be seen that I effect a rotative or rectilinear movement of one portion or element, such as a shaft, from another operating portion or element, such as a sleeve, (through which latter passes the operated part,) through the medium of a series of balls or rollers arranged within tapering or wedge-shaped recesses or spaces formed between the two parts and adapted to act upon the inner part, and it will also be apparent that my invention is equally well adapted to be applied to or embodied in various mechanical tools or devices other than those specified herein.

What I claim as new, and desire to secure by Letters Patent, is—

1. In a tool, the combination with a rotatable shaft, a sleeve surrounding said shaft, the opposing surfaces of said parts being constructed to form tapering or wedge-shaped recesses between them, a series of balls or rollers arranged in said recesses, a ring mounted upon the shaft, and a series of springs secured at one end to said ring and extending vertically up between the balls or rollers and bearing at their opposite ends upon the said balls or rollers, as and for the purpose specified.

2. In a tool, the combination with a rotatable shaft, a sleeve surrounding said shaft, the opposing surfaces of said parts being constructed to form tapering or wedge-shaped recesses between them, a series of balls or rollers arranged in said recesses, a ring revolubly mounted and adapted to be circumferentially adjusted upon the shaft, and a series of springs secured at one end to the ring and extending vertically up between the balls or rollers and bearing at their opposite ends upon said balls or rollers, as and for the purpose specified.

3. In a tool, the combination with a rotatable shaft, a sleeve surrounding said shaft, the opposing surfaces of said parts being constructed to form tapering or wedge-shaped recesses between them, a series of balls or rollers arranged in said recesses, a ring revolubly mounted upon the shaft and provided with a series of notches, the said rotatable shaft being provided with a notch adapted to register with the notches in the ring when the latter is turned, a key adapted to be driven into the notch of the shaft, and a notch of the ring, and a series of springs secured at one end to the ring and extending vertically up between the balls or rollers and bearing at their opposite ends upon said balls or rollers, as and for the purpose specified.

4. In a tool, the combination with a shaft, a sleeve surrounding said shaft, the opposing surfaces of said parts being constructed to form tapering or wedge-shaped recesses between them, a series of balls or rollers arranged in said recesses, a ring mounted and adapted to be adjusted upon the shaft, a series of springs secured to the ring and arranged in pairs between the balls or rollers and adapted to bear upon opposite sides of the latter when the ring is adjusted as described for the purpose specified.

In witness whereof I have hereunto signed my name in the presence of two subscribing witnesses.

BIRGER LJUNGSTRÖM.

Witnesses:
ERNST SVANGIRST,
E. HERMANSSON.